United States Patent [19]

Rafferty et al.

[11] Patent Number: 5,348,215
[45] Date of Patent: Sep. 20, 1994

[54] METHOD OF BONDING HARD METAL OBJECTS

[76] Inventors: Kevin Rafferty, 193 Countryview Dr., Harrison, Ohio 45030; Bruce Rowe, 3043 Wold Ave., Cincinnati, Ohio 45206

[21] Appl. No.: 971,458

[22] Filed: Nov. 4, 1992

[51] Int. Cl.⁵ .............................................. B23K 31/02
[52] U.S. Cl. ................................. 228/181; 228/248.1; 228/252
[58] Field of Search ................ 228/181, 252, 246, 248

[56] References Cited

U.S. PATENT DOCUMENTS

| | | | |
|---|---|---|---|
| 3,743,556 | 7/1973 | Breton et al. | 156/62.8 |
| 3,778,586 | 12/1973 | Breton et al. | 219/76 |
| 3,917,149 | 11/1975 | Breton et al. | 228/124 |
| 3,997,447 | 12/1976 | Breton et al. | 210/360 |
| 4,016,345 | 4/1977 | Holmes | 526/206 |
| 4,042,747 | 8/1977 | Breton et al. | 428/323 |
| 4,325,754 | 4/1982 | Mizuhara et al. | 148/22 |
| 4,477,527 | 10/1984 | Grosner | 428/401 |
| 4,563,329 | 1/1986 | Morishita et al. | 419/9 |
| 4,596,746 | 6/1986 | Morishita et al. | 428/458 |
| 4,622,445 | 11/1986 | Matsen | 228/181 |
| 4,869,421 | 9/1989 | Norris et al. | 228/181 |
| 5,135,156 | 8/1992 | Bower | 228/181 |

*Primary Examiner*—P. Austin Bradley
*Assistant Examiner*—Jeffrey T. Knapp

[57] ABSTRACT

Two metal objects are bonded together by positioning a brazing composite on the surfaces that are to be bonded together and heating the metal objects causing the composite to disintegrate with brazing alloy that is held in the composite melting to bond the two surfaces together. The composite is a combination of the brazing alloy and fibrillater polytetrafluoroethylene. This product which is very malleable can be formed to any desired shape to facilitate bonding a variety of different objects together. It is particularly useful for bonding honeycombed objects to metal surfaces.

12 Claims, No Drawings

METHOD OF BONDING HARD METAL OBJECTS

BACKGROUND OF THE INVENTION

Brazing is one of many ways frequently used to bond metal objects together. According to this bonding method, brazing metal is placed at the connection point between the two objects and they are heated until the brazing powder melts which in turn metallurgically bonds the objects together. Particularly in the aerospace industry, this is used to assemble various pans of a jet engine. For example, the rotors in the jet engine are formed from individual vanes which extend between inner and outer bands. These vanes are brazed to the inner and outer bands. Also, around the engine housing is a honeycomb material which acts as an abradable seal between the housing and the rotor assembly. This honeycomb must also be brazed or bonded to an engine part or assembly. Combustion liners are also formed by brazing metal sheets together.

Using brazing powders is particularly difficult and inefficient. Getting the brazing powder in position, in the fight quantities evenly distributed is difficult. Maintaining it in position is also difficult.

There are composite products which are the braze powders held together by binding material. But the product is relatively rigid and requires special forming tools that are very expensive with thinner small cell honeycomb material. Due to the nature of the product, it is very difficult to use. Other binders are unsuitable because they leave ash behind on the surface which interferes with the bonding or corrode the treated metal surface.

Other products and brazing atmospheres may cause an oxide to form on the metal surface. The oxide interferes with the formation of a good bond. The oxides are a problem with alloys of aluminum, timium, hafnium and chromium. To avoid this, the products are nickel coated prior to brazing to avoid oxide formation. This is obviously very expensive. It also may require the pan being nickel coated to be partially masked to avoid nickel coating undesired portion of the article.

SUMMARY OF THE INVENTION

The present invention is premised on the realization that two objects can be bonded together using a brazing technique wherein the brazing powder is held in a brazing composite formed from fibrillated polytetrafluoroethylene (PTFE). The two objects being bonded together are simply positioned next to each other with the brazing alloy composite between the surfaces being bonded and then heating the objects. This causes the PTFE to evaporate and the braze alloy to melt, thereby bonding the two objects together along their adjoined surface. This is particularly useful in assembling jet engines.

The brazing composite can be in the form of a rope and used to bond rotor veins to the inner and outer rotor bands. It can also be used as a sheet to bond a honeycomb surface to a metal sheet or surface as well as for many other applications in the jet engine.

Since the polytetrafluoroethylene releases hydrogen fluoride gas at brazing temperatures, it cleans the surfaces and prevents oxide formation. Thus, nickel coating is not necessary.

The objects and advantages of the present invention will be further appreciated in light of the following detailed description.

DETAILED DESCRIPTION

The present invention is a method of bonding two hard metal surfaces together using a brazing technique. Hard metal surfaces include, of course, all forms of stainless steel, as well as nickel. cobalt, titanium and tungsten based superalloys such as Rene 35, Rene 41, Rene 77, Rene 80, Rene 80H, Rene 95, Rene 125, Rene 142, Iconel 713, Incoriel 718, Hastelloy X, Wasp alloy, Haynes 188, L605, X-40, and Man M-509. These are bonded together by positioning a brazing alloy composite material between the two surfaces being bonded and heating the surfaces along with the tape up to a temperature which will effectively cause the braze alloy in the composite to melt and bond the surfaces together.

The composite itself is formed from a braze alloy powder held together by a minor portion of polytetrafluoroethylene (PTFE). A specific type of PTFE is required, specifically fibrillated PTFE.

The fibrillated PTFE polymer used in the process of this invention is a high molecular weight PTFE resin produced by emulsion polymerization. These PTFE polymers have a broad molecular weight range of about 10-20 million and are commercially available products. Preparation of these polymers which is described in U.S. Pat. No. 2,510,112, U.S. Pat. No. 2,587,357, and U.S. Pat. No. 2,685,707 involves well known emulsion polymerization techniques wherein tetrafluoroethylene under pressure and water containing an emulsifying agent is reacted with a water soluble free radical catalyst. The emulsion produced is coagulated, washed and then dried. The average particle size of the polymer is about 50-560 microns. Polymer having larger or smaller average particle size is operative.

The PTFE used to make the composition is commercially available from E.I. DuPont and Company, Wilmington, Delaware sold under the trade designation Teflon ®6C. The braze composite for use in the present invention will have from 0.25 to about 25 % of the fibrillated PTFE and preferably 1 to about 15 % by weight. The preferred composition includes 2 % PTFE by weight.

The second component of the brazing composite is the braze alloy itself which will make up the remainder of the composition. There are many known braze alloys which can simply be purchased. The makeup of several of these compositions are listed below:

| | | |
|---|---|---|
| 1. | Boron | 2.9 |
| | Nickel | 92.6 |
| | Tin | 4.5 |
| 2. | Boron | 3.0 |
| | Chromium | 7.0 |
| | Iron | 3.0 |
| | Nickel | 83.0 |
| | Silicon | 4.0 |
| 3. | Chromium | 19.0 |
| | Nickel | 71.0 |
| | Silicon | 10.0 |
| 4. | Boron | 1.8 |
| | Nickel | 94.7 |
| | Silicon | 3.5 |
| 5. | Boron | 0.8 |
| | Cobalt | Balance |
| | Chromium | 19.0 |
| | Nickel | 17.0 |
| | Silicon | 8.0 |
| | Tungsten | 4.0 |

-continued

| | | |
|---|---|---|
| 6. | Boron | 2.75 |
| | Chromium | 10.5 |
| | Nickel | 50.3 |
| | Palladium | 36.0 |
| | Silicon | 0.5 |

Such braze alloys can be purchased from companies such as Westgo, Praxair and others.

To form the composite material the fibrillated PTFE (Teflon ®6C) is combined with the braze alloy in a ball mill or other low shear mixer such as a KD miller with kinetic dispersion or a vibratory mixer.

In a ball mill, the mixture is milled at about 200 rpm using 3/8 inch stailess stell balls. This is continued until the mixture changes from a powder to small agglomerated particles generally 10 to 40 minutes (25 minutes normally). If this is continued to long, a thick viscous material like putty is obtained.

The mixture is then separated from the steel balls and rolled between adjustable rollers to a thickness of 0.001 to 0.5 inches. Specifically, the mixture is rolled between pressure rollers in a first direction, then the formed sheet is folded and the folded sheet is rolled in a direction which is 90° from the axis of the first rolling step, i.e., cross rolled. Each rolling step decreases the thickness of the sheet. Preferably, the sheet is separated from the rollers by an aluminum foil separating sheet or other suitable material. This is continued until the desired thickness and consistency is obtained. The composite can also be folded on itself to form a rope-like structure.

To use the composite, the two metal surfaces which being bonded together are placed against each other with the braze composite at the joint. The thickness of the material is established to provide the amount of brazing material required per the surface area being bonded. Generally, with a tape that is 98% brazing powder, the tape thickness is 0.001 to 0.012 inches although this may change depending on the application.

With the two surfaces of the objects being bonded in contact with the brazing composite, the two objects are heated to a temperature of at least about 800° F. to 2300°° F. which causes the PTFE to evaporate and the braze alloy to melt. For most nickel and cobalt alloys, at least 1750° F. is required. The braze alloy will then, upon cooling, bond the objects together.

With alloys of titanium, aluminum, chromium and hafnium, heating to a temperature above 800° F. causes oxide formation. With the present invention, the hydrogen fluoride generated as the tape is heated removes the oxides of these metals allowing a good braze joint without prior nickel plating.

To bond a honeycomb structure to a surface, the composite, which has a thickness of 0.001" to 0.06", is pressed or embedded into the honeycomb structure. For example, a honeycomb with a 1/32" cell diameter may require 0.025" tape providing about 2 grams brazing alloy per square inch. A honeycomb with 1/64" diameter cell would require 0.5" tape providing 4 grams per square inch because the decreased cell size provides more edge surface to be brazed. The honeycomb is placed against a metal surface with the composite against the metal surface. This is heated to the brazing temperature of the brazing alloy employed. This bonds the honeycomb to the metal and provides a precise control of the amount and location of the brazing powder. This is very effective in bonding the honeycomb to the surface of the jet engine assembly.

In bonding vanes to inner and outer rotor bands, the vanes are put in position in slots in the inner and outer bands and the composite material is pressed around the fan vane at the point where it contacts the inner and outer bands. Generally, the braze rope will have a 1/16 to 3/32 inch diameter. This is pressed into position to conform to the joint between the vane and the band and the assembly is heated as previously described.

EXAMPLE

A laminated assembly, made from Rene 41 is to be brazed using AMS 4777 braze alloy powder. The assembly is comprised of (3) plates which lie on top of one another. it is normally desirable to nickel plate the braze joint surfaces to prevent possible oxide formation during the braze cycle. Use of the present invention, comprised of AMS 4777 braze powder (97×by weight), and 3×PTFE resin will eliminate this plating operation. The tape shall be 0.003" and be cut to match the surfaces of the braze joints. The tape sections are placed between the laminations and the assembly subsequently processed through a braze cycle at approximately 1925° F. in vacuum.

Thus, using the present invention provides many different advantages which are absolutely required in the manufacture of jet engines. It provides a very controlled amount of braze alloy at a specific location. It maintains it in position during heat treatment, permitting the brazing to occur. Further, the polytetrafluoroethylene evaporates without leaving any residue which might interfere with the bonding. In fact, the polytetrafluoroethylene actually provides a cleaning effect when it evaporates. This permits oxygen sensitive alloys of aluminum, titanium, chromium and hafnium to be brazed without first being nickel coated.

Further, since the product itself is malleable at relatively low pressures and temperature, it can be put into position and formed to the desired shape without requiting any special tooling. This can be worked into position using one's hand which greatly facilitates manufacturing.

Although this has been a description of the present invention and the best mode of practicing the invention, the present invention should only be defined by the appended claims wherein we claim:

We claim:

1. A method of bonding a first surface of a first metal object to a second surface of a second metal object comprising:

placing a brazing composite on said first surface wherein said brazing composite comprising a brazing alloy held together by fibrillated polytetrafluoroethylene; and wherein said second surface is a honeycomb surface and said surface is pressed against said brazing to said brazing composite into said honeycomb; and wherein said first and second hard metal objects are selected from the group consisting of stainless steel, nickel based super alloys and cobalt based super alloys, heating said first object and said second object and said brazing composite in an inert environment to a temperature effective to melt the braze alloy held in said composite and evaporate said fibrated polytetrafluoroethylene thereby causing said first surface to be bonded to said second surface.

2. The method claimed in claim 1 wherein said tape comprises from about 1 to about 15% polytetrafluoroethylene by weight.

3. The method claimed in claim 1 wherein said braze alloy powder is a mixture of metals selected from the group consisting of boron, nickel, tin, chromium, iron, silicon, cobalt, chromium, tungsten, palladium, gold, silver, copper, magnesium, and platinum.

4. The method claimed in claim 1 wherein said brazing composite is a tape which has a thickness of about 0.001" to about 0.5".

5. The method claimed in claim 1 wherein said first and second objects are alloys having at least a portion of a metal selected from the group consisting of aluminum, titanium, hafnium, and chromium and said first and second objects are not nickel coated prior to heating.

6. A method of bonding a first surface of a first metal object to a second surface of a second metal object wherein said first and second metal objects are nickel-based supper alloys containing at least one oxygen-sensitive metal selected from the group consisting of aluminum, titanium, hafnium and chromium wherein said surfaces are not nickel plated prior to bonding;

comprising placing a brazing composite on said first surface wherein said brazing composite comprises a brazing alloy held together by fibrillated polytetrafluoroethylene; and positioning said second surface against said brazing composite; and heating said first object and said second object and said brazing composite in an inert environment to a temperature effective to melt the braze alloy held in said composite and evaporate said fibrillated polytetrafluoroethylene, thereby causing said first surface to be bonded to said second surface.

7. The method claimed in claim 6 wherein said second surface is a honeycomb surface and said surface is pressed against said brazing composite to force said brazing composite into said honeycomb.

8. The method claimed in claim 6 wherein said tape comprises from about 1% to about 15% polytetrafluoroethylene by weight.

9. The method claimed in claim 6 wherein said braze alloy is a mixture of metals selected from the group consisting of boron, nickel, tin, chromium, iron, silicon, cobalt, tungsten, palladium, gold, silver, copper, magnesium and platinum.

10. The method claimed in claim 6 wherein said brazing composite is a tape which has a thickness of about 0.001 inches to about 0.5 inches.

11. The method claimed in claim 6 wherein said first object is a vane of a jet enine and said second object is a rotor band of a jet engine.

12. The method claimed in claim 6 wherein said first object is a metal plate and said second object is a metal plate wherein said plates are laminated together by said brazing composite.

* * * * *